Patented July 24, 1951

2,561,671

UNITED STATES PATENT OFFICE 2,561,671

ANTISUN-CHECKING RUBBER COMPOSITION

William B. Plummer, Chicago, Ill., assignor to Standard Oil Company, Chicago, Ill., a corporation of Indiana No Drawing. Application February 26, 1949, Serial No. 78,668

5 Claims. (Cl. 260—810)

The present invention relates to improvements in preserving and compounding rubber and rubber-like substances and has particular reference to an improved composition of matter comprising a rubber that is protected against the aging ordinarily accelerated by the action of the sun.

The attack of the atmosphere and sunlight upon rubber results in a checking or cracking of the surface of the rubber and a resultant loss of tensile strength and elasticity. The phenomenon is sufficiently general and damaging that many special agents have been proposed to retard this premature degradation of rubber materials. Many of these agents are objectionable for various reasons such as being toxic or expensive or otherwise unsuitable for the specific purpose of preventing the combined effect of atmosphere and sunlight. One of the materials used in the rubber industry to retard the effect of sunlight (as opposed to anti-oxidants, that also suppress oxidation of rubber in the dark) is paraffin wax. Paraffin wax is disadvantageous in certain steps of rubber manufacturing processes, especially insofar as it interferes with adherence of assembled rubber parts, and its effectiveness as an anti-sun-checking agent is reduced by the fact that the protective bloom of paraffin which rises to the surface of the rubber tends to flake off.

It is an object of the present invention to provide a rubber composition that will preserve the desirable characteristics of the rubber, either natural or synthetic, and will provide an enhanced resistance to the degeneration of rubber that is caused by the attack of atmosphere and sunlight. It is another object of the invention to provide a method and means for manufacturing a rubber composition having increased resistance to sunlight. It is a further object of the invention to provide an economically obtainable single ingredient which, in combination with rubber will effect improved resistance of the latter to the said attack of sunlight and will, in addition, act to a substantial extent as a plasticizer of the rubber compositions. Other objects and advantages will be apparent in the specification and appended claims.

The said objects of the present invention are accomplished by admixing with a natural or synthetic rubber or a rubber composition, the polymeric residue that is produced in hydrocarbon synthesis wherein liquid hydrocarbons and oxygenated compounds are produced from hydrogen and carbon monoxide in the presence of an iron catalyst. Hydrocarbon synthesis is usually performed at temperatures from about 200° to 350° C. and under superatmospheric pressures from slightly in excess of atmospheric to as high as about 600 pounds per square inch gauge. An enhanced yield of the polymeric residue is produced when the aforesaid iron catalyst contains an alkali metal oxide or carbonate promoter.

The aforesaid polymeric residue is produced as a primary condensate from the condensible gases that are manufactured in the described hydrocarbon synthesis process or it can be a residue from a fractional distillation of liquid product therefrom or it can constitute a mixture of the two. Polymeric residue has a pour point close to room temperature and is obtained, consequently, sometimes as a liquid and sometimes as a solid. In either case, it is often termed "hydrocarbon synthesis gas oil." The polymeric residue is a mixture of heavy hydrocarbons and oxygenated compounds, a high proportion of which is unsaturated. Of the hydrocarbons some 20 to 30 per cent are paraffinic, and the remaining 70 to 80 per cent are olefinic. A very considerable portion of the olefins are mono-olefins. The polymeric residue is soluble in 50-50 benzol-acetone, and ranges in carbon number from about $C_{11}$ to $C_{35}$ and perhaps, to a minor extent, somewhat higher. The product contains about 10 to 12 per cent oxygenated compounds including alcohols, aldehydes, acids, esters, and ketones. Normally, about 5 per cent and a maximum of 10 per cent of the hydrocarbons are normal paraffins, the branching of the chains being largely methyl groups and increasing in number of branched chains per molecule with increase in molecular weight.

The polymeric residue can be resolved by solvents to an oil and another portion, a solid melting in the range of 50° and 100° C. For example, one volume of the said residue can be dissolved in ten volumes of benzol and acetone, in equal parts, and cooled to —10° F. The so-precipitated high-melting hydrocarbons are filtered and washed with hexane. At least 25 per cent of the total polymeric residue should consist of the said high-melting hydrocarbons and the content of the high melting ingredient can vary from the above minimum figure to as high as 100 per cent. Polymeric residue containing less than 50 per cent by weight of the waxy high-melting ingredient is as effective a sun-proofing agent as an equal weight of the best commercially available anti-sun-checking waxes; and if separated, the said high-melting ingredient, that is the active anti-sun-checking agent of the polymeric residue, can be used in amounts as low as one part per 100 parts of rubber. It should be pointed out, however, that a major element of the economy arising in the present process of retarding sun-checking of rubber and of the manufacture of the improved composition resides in the fact that the expensive process of de-oiling is unnecessary and the polymeric residue as first obtained is a rubber compounding agent. In addition, the oil-constituent of the polymeric residue is effective as a plasticizer in rubber compositions.

In compounding the polymeric residue with rubber, it is preferred, in order to withstand the more severe attacks of strong sunlight on rubber under considerable stress, to incorporate at least five parts by weight of a polymeric residue being about one-half oil per 100 parts of rubber. However, sufficient polymeric residue to supply about one part by weight of the high melting (50°–100° C.) ingredient of the residue per 100 parts of rubber will provide adequate protection under customary conditions of use. As will be illustrated in the following specific examples, a ratio of 7½ parts by weight of polymeric residue per 100 parts of rubber provides to rubber under stress excellent protection against strong summer sunlight. Except in those instances where it is desired to alter the characteristics of a rubber composition (as in rubber desk mats in which 30 to 50 parts of polymeric residue per 100 parts of rubber may be used), a maximum of 20 parts of polymeric residue and preferably not more than 10 parts thereof should be used.

In the following examples in which are reported the resistance to sunlight exhibited by rubber compositions containing the polymeric residue, the test samples were compared with rubber compositions containing a commercial anti-sun-checking agent, A, that is a mixture of greenish, waxy materials having a specific gravity of 0.90, a melting point range of 67° to 69° C., and is similar to that described in U. S. 1,832,964; a commercial anti-sun-checking agent, B, that is a waxy composition similar to agent A; and paraffin wax.

The polymeric residue employed in the rubber compositions described in the following specific examples was produced by the catalytic synthesis of hydrocarbons from carbon monoxide and hydrogen reacting in the presence of an alkalized iron catalyst. The synthesis reaction was performed in the temperature range of 315° to 343° C. under a pressure of 250 p. s. i. and at a 2:1 recycle ratio. The fluidized catalyst consisted of an equilibrium mixture of metallic iron and iron oxide upon which was deposited 0.47 per cent by weight of $K_2O$. A primary condensate or gas oil constituting an average of 3.9 per cent of the total weight balance of the synthesis was recovered from the product gases. A portion of the product was recovered by initial condensation at high temperature and the remainder was obtained as residue from distillation of the liquid hydrocarbons condensed in a water cooled condenser. The portions were mixed in the proportion of their initial formation and thus provided a solid product having a melting point slightly above room temperature. This material, which constituted the polymeric residue used in the following examples, displayed the following analysis:

A. S. T. M. distillation:

| | °C. |
|---|---|
| First drop | 208 |
| 10% | 232 |
| 50% | 323 |
| Max | 379 |

Receiver, collected in 70%

11.9% by wt. oxygenated compounds
1.35% by wt. acids
33.7% by wt. solids having a M. P. of 66° C.

*Example 1*

A composition consisting of the following ingredients was compounded:

| | Parts |
|---|---|
| Smoked rubber sheet | 100 |
| Carbon black | 50 |
| Zinc oxide | 5 |
| Amine—reaction product, anti-oxidant | 5 |
| Rubber accelerator (benzol thiazol disulfide) | 1 |
| A low volatile petroleum base plasticizer | 5 |
| Stearic acid | 2 |
| Sulfur | 2.5 |

The above composition was selected solely for the purpose of illustration and no ingredient or proportion thereof is critical in effecting the objects of this invention.

The above composition was separately compounded by conventional mill-mixing with different amounts, as hereinafter given, of polymeric residue, anti-sun-checking agents A, and B, and paraffin wax, and was then sheeted and cut into test slabs ⅛″ x 2″ x 8″ which were individually cured 10, 15, and 20 minutes at 158° C. A small loop was formed by wrapping one end of a test slab around a ¼ inch-diameter rod and nailing the end of the loop to a board. The long end of the test slab was then folded over to meet the end of the small loop, thus forming a large loop. The end of the large loop was also nailed to the board. The boards were placed with the small loop up, facing the south and disposed at an angle of 45 degrees to the horizontal. The so-arranged test slabs were exposed to temperate (about 45° N. latitude) summer sunlight for thirty consecutive days.

Test slabs having the above given composition and containing 7.5, 10 and 15 per cent of polymeric residue were compounded and tested according to the procedure set forth above. For a basis of comparison, anti-sun-checking agents A and B and paraffin wax in 7.5 and 10 parts per 100 parts of rubber (i. e., the said rubber sheet) were compounded with the above rubber composition and tested at the same time and by the same procedure.

After thirty days exposure, the measure of protection against sun-checking provided by the agents as determined by observation of the condition of each test slab was as follows:

Polymeric residue, in 7.5, 10, 15, and 20 parts per 100 parts of rubber—excellent protection
Commercial agent A in 7.5 and 10 parts per 100 parts of rubber—excellent protection
Commercial agent B in 10 parts per 100 parts of rubber—excellent protection
Paraffin in 7.5 and 10 parts per 100 parts of rubber—slight protection
Commercial agent B in 7.5 parts per 100 parts of rubber—inadequate protection All of the rubber compositions containing the polymeric residue were as well protected from the effects of sun and atmosphere as the best of the commercial agents, even though in the case of the composition containing 7.5 parts of polymeric residue an actual weight of only 3.5 parts of high-melting waxy material was present therein.

*Example 2*

In another example wherein sample slabs were exposed to considerably more intense sunlight, samples comprising substantially the same basic rubber composition and containing polymeric residue in, respectively, 7.5, 10, 15, and 20 parts of the polymeric residue per 100 parts of rubber, were tested. In this instance, the samples were exposed to the semi-tropical sun (about 26° N. Latitude) for thirty consecutive days in June and July. Again, anti-sun-checking agents A and B and paraffin in 7.5 and 10 parts per 100 parts of rubber were so-compounded and tested for purpose of comparison. After the thirty days' exposure, the measure of protection against sun-checking provided by the anti-sun-checking agents as determined by observation of the condition of each test slab was as follows:

Polymeric residue, in 7.5, 10, 15, and 20 parts per 100 parts of rubber—excellent protection
Commercial agent A in 7.5 and 10 parts per 100 parts of rubber—excellent protection
Paraffin in 7.5 and 10 parts per 100 parts of rubber—slight protection
Commercial agent B in 7.5 and 10 parts per 100 parts of rubber—inadequate protection Here again even the minimum quantity of polymeric residue (7.5 parts of polymeric residue or 3.5 parts of the solid, high-melting, anti-sun-checking agent) was sufficient to give substantially complete anti-sun-checking protection to the rubber. This protection was equivalent to that provided by 7.5 parts of the best commercial product of those used in the tests as a basis for comparison, and again was superior to the protection obtained by all other agents.

Further examples of similar compounding in sunlight testing indicated that both the polymeric residue containing only about 33 per cent of the high-melting mixture of hydrocarbons and oxygenated compounds and the best commercial anti-sun-checking agent, (A), when used in amounts such as, for example, three parts per one hundred parts of rubber, were inadequate to provide complete anti-sun-checking protection under the severe test conditions employed, even though in most applications agents A and B are used in percentages of about two to four. Analogously, it can be seen that for normal exposure conditions lower percentages of polymeric residue of from 2 to 5 per cent, which may be preferred for other compounding reasons, will in most circumstances be adequate to provide sunlight protection. Converting these percentages to amounts of the separated high-melting solid portion of the polymeric residue so as to base the required limits upon this agent without accompanying oil, about one percent, by weight, of the said high melting solid will provide adequate protection under usual operating conditions. As an explanation of the surprising effectiveness of small quantities of the polymeric residue as an anti-sun-checking agent, it is suggested that the olefinic nature of a portion (at least 10 per cent) of the product, as aforementioned, may contribute to incompatibility in rubber and result in an increased tendency to "bloom" therefrom and provide a protective surface on the rubber.

It has been observed that the polymeric residue employed in the above protected rubber compositions is a product directly recoverable from a manufacturing process. No expensive refining process such, for example, as "de-oiling" the high-melting product is necessary to produce this valuable and effective constituent of rubber compositions.

Having now described my invention, I claim:

1. The method of protecting rubber against the deteriorating effects of sunlight and atmosphere that comprises adding to a rubber and compounding therewith a polymeric residue that consists predominantly of saturated and olefinic hydrocarbons and oxygenated organic compounds having between about 11 to 35 carbon atoms per molecule that boils above 200° C. and is obtained directly as a product of the synthesis of liquid hydrocarbons from carbon monoxide and hydrogen at a temperature between about 200° and 350° C. at superatmospheric pressure, in the presence of a promoted iron catalyst and contains at least 25 per cent by weight of a mixture of hydrocarbons and oxygenated compounds that has a melting point between 50° and 100° C.

2. The method of claim 1 in which at least five parts and at most twenty parts by weight of polymeric residue per one hundred parts by weight of rubber are compounded in the rubber composition.

3. As a composition of matter, a rubber composition that is protected against the deteriorating effect of sunlight and comprises for every one hundred parts by weight of rubber, a carbon filler, stabilizing and accelerating agents, sulfur, a low volatile petroleum base plasticizer and at least five parts by weight of a polymeric residue directly obtained, as primary condensate boiling between 200° and 400° C., from the synthesis of liquid hydrocarbons from carbon monoxide and hydrogen at a temperature between about 200° and 350° C., at a superatmospheric pressure, and in the presence of an alkalized iron catalyst, the said polymeric residue comprising about 90% by weight hydrocarbons predominantly of 11 to 35 carbon atoms per molecule and the remainder organic oxygenated compounds, the said hydrocarbons being about 70 to 90% by weight olefinic, at least 25 per cent by weight of the mixture of hydrocarbons and oxygenated compounds melting between 50° and 100° C. and at least 10 per cent by weight of the said polymeric residue consisting of an oil that is effective in the composition as a plasticizer.

4. A method of protecting rubber against the deteriorating effects of sunlight and atmosphere that comprises adding to one hundred parts by weight of a rubber and compounding therewith an amount between about one and 20 parts by weight of an anti-sun-checking agent consisting essentially of a mixture of hydrocarbons and organic oxygenated compounds melting between about 50° and 100° C., the said mixture constituting by weight at least 25% of a hydrocarbon-synthesis gas oil that boils above 200° C., contains oxygenated organic compounds and hydrocarbons having from about eleven to about 35 carbon atoms per molecule and being at least about 70% olefinic, and is directly obtained as a product of the synthesis of liquid hydrocarbons from carbon monoxide and hydrogen in the presence of an alkalized iron catalyst at temperatures between 200° and 300° C., and at superatmospheric pressure.

5. As a composition of matter, a protected rubber comprising 100 parts by weight of rubber and an amount greater than 1 part by weight of a polymeric residue directly obtained, as a primary condensate boiling between 200° and 400° C., from the synthesis of liquid hydrocarbons from carbon monoxide and hydrogen at a temperature between about 200° and 300° C. at a superatmospheric pressure, and in the presence of a promoted iron catalyst, the said polymeric residue comprising about 90 per cent by weight hydrocarbons of predominantly 11 to 35 carbon atoms per molecule and the remainder organic oxygenated compounds, the said hydrocarbons being about 70 to 90 percent by weight olefinic, at least 25 percent by weight of the mixture of hydrocarbons and oxygenated compounds melting between 50° and 100° C.

WILLIAM B. PLUMMER.

REFERENCES CITED

The following references are of record in the file of this patent:

UNITED STATES PATENTS

| Number | Name | Date |
|---|---|---|
| 1,611,436 | Hall | Dec. 21, 1926 |
| 1,832,964 | Bradley et al. | Nov. 24, 1931 |
| 2,337,339 | McCluer et al. | Dec. 21, 1943 |
| 2,422,002 | Elwell et al. | June 10, 1947 |

Certificate of Correction

Patent No. 2,561,671                                                     July 24, 1951

WILLIAM B. PLUMMER

It is hereby certified that error appears in the printed specification of the above numbered patent requiring correction as follows:

Column 4, line 8, Example 1, for read     Amine-reaction product, anti-oxidant_____ 5

Amine-reaction product, anti-oxidant_____ 1 and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*